(12) United States Patent
Sheng et al.

(10) Patent No.: US 9,648,207 B2
(45) Date of Patent: May 9, 2017

(54) SMART COPY APPARATUS

(71) Applicant: AVISION INC., Hsinchu (TW)

(72) Inventors: Thomas Sheng, Hsinchu (TW);
Yen-Cheng Chen, Hsin Chu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/920,649

(22) Filed: Oct. 22, 2015

(65) Prior Publication Data

US 2016/0127605 A1    May 5, 2016

(30) Foreign Application Priority Data

Oct. 29, 2014  (TW) .............................. 103137336 A

(51) Int. Cl.
*G06K 15/00* (2006.01)
*H04N 1/46* (2006.01)
*H04N 1/393* (2006.01)

(52) U.S. Cl.
CPC ................................. *H04N 1/3935* (2013.01)

(58) Field of Classification Search
None
See application file for complete search history.

(56) References Cited

U.S. PATENT DOCUMENTS

| | | | | |
|---|---|---|---|---|
| 5,732,230 A * | 3/1998 | Cullen | ................. | H04N 1/3876 345/629 |
| 6,038,349 A * | 3/2000 | Cullen | ................. | G06K 9/6203 358/450 |
| 6,999,100 B1 * | 2/2006 | Leather | ................. | G06T 15/005 345/611 |
| 7,170,515 B1 * | 1/2007 | Zhu | ........................ | G06T 15/005 345/422 |
| 7,599,078 B2 * | 10/2009 | Sano | ................... | H04N 1/00915 358/1.13 |
| 7,826,074 B1 * | 11/2010 | Wang | ................... | G06F 3/03545 358/1.13 |
| 7,999,968 B2 * | 8/2011 | Teranishi | ............. | H04N 1/3872 358/1.15 |
| 8,934,146 B2 * | 1/2015 | Kaneko | ................ | G06K 15/005 358/3.06 |
| 9,311,548 B2 * | 4/2016 | Constantinou | ........ | G06K 9/6202 |
| 2004/0073549 A1 * | 4/2004 | Turkel | ................ | G06F 17/3046 |
| 2006/0126095 A1 * | 6/2006 | Tamura | .............. | H04N 1/00838 358/1.14 |
| 2006/0171750 A1 | 8/2006 | Sheng | | |

(Continued)

FOREIGN PATENT DOCUMENTS

| | | |
|---|---|---|
| CN | 203998225 U | 12/2014 |
| TW | I268406 | 12/2006 |

(Continued)

*Primary Examiner* — Madelein Nguyen

(57) ABSTRACT

A smart copy apparatus comprises a scanning module, a processing module and a printing module. The scanning module scans an original to obtain fragment scan images. The processing module electrically connected to the scanning module receives the fragment scan images, and determines a size of the original according to the fragment scan images to obtain a scan-size parameter, and generates print data according to the fragment scan images, the scan-size parameter and a print parameter. The printing module receives the print data, and prints the print data on a print medium.

11 Claims, 4 Drawing Sheets

(56) References Cited

U.S. PATENT DOCUMENTS

| | | | |
|---|---|---|---|
| 2007/0229503 A1* | 10/2007 | Witzel | G06T 15/503 |
| | | | 345/428 |
| 2008/0152235 A1* | 6/2008 | Bashyam | G06F 17/30153 |
| | | | 382/224 |
| 2008/0154928 A1* | 6/2008 | Bashyam | H03M 7/30 |
| 2009/0059314 A1 | 3/2009 | Liao | |
| 2011/0013222 A1 | 1/2011 | Sheng | |
| 2011/0222095 A1 | 9/2011 | Sheng | |
| 2011/0292464 A1 | 12/2011 | Shih | |
| 2014/0029073 A1* | 1/2014 | Wang | G06T 5/005 |
| | | | 358/518 |
| 2014/0177010 A1* | 6/2014 | Lee | H04N 1/3878 |
| | | | 358/474 |
| 2014/0288970 A1* | 9/2014 | Lee | G06F 19/321 |
| | | | 705/3 |
| 2015/0010062 A1* | 1/2015 | Gokhale | H04N 19/61 |
| | | | 375/240.03 |
| 2015/0288964 A1* | 10/2015 | Puri | H04N 19/70 |
| | | | 375/240.03 |

FOREIGN PATENT DOCUMENTS

| | | |
|---|---|---|
| TW | 201102910 A1 | 1/2011 |
| TW | 201131366 A1 | 9/2011 |
| TW | I373956 | 10/2012 |

\* cited by examiner

SMART COPY APPARATUS

This application claims priority of No. 103137336 filed in Taiwan R.O.C. on Oct. 29, 2014 under 35 USC 119, the entire content of which is hereby incorporated by reference.

BACKGROUND OF THE INVENTION

Field of the Invention

The present invention relates to a smart copy apparatus, and more particularly to a smart copy apparatus for determining a size of an original by way of image processing, and selecting a print medium according to the size of the original.

Related Art

A copier performs a scan step and a print step to complete the copying process. Upon scanning, an original size detector of the copier detects a size of the original, and then the copy process is performed according to parameters, such as the magnification power, the number of copies, the print tray or the like selected by the user. However, when an optical or mechanical original size detector is adopted, additional costs are caused, and the circuit layout also becomes complicated. Furthermore, the detected result of the optical or mechanical original size detector sometimes encounters the problem that the precision is not high enough. For example, the A4 size and Letter size sometimes tend to incorrectly judged due to the error of the position where the original is placed.

SUMMARY OF THE INVENTION

Accordingly, the present invention has been proposed to solve the problems of the prior art, and an object of the present invention is to provide a smart copy apparatus without an original size detector, wherein a size of an original is precisely determined by way of image processing, and a suitable print medium is selected according to the determined result.

To achieve the above-identified object, the present invention provides a smart copy apparatus comprising a scanning module, a processing module and a printing module. The scanning module scans an original to obtain fragment scan images. The processing module electrically connected to the scanning module receives the fragment scan images, determines a size of an original according to the fragment scan images to obtain a scan-size parameter, and generates print data according to the fragment scan images, the scan-size parameter and a print parameter. The printing module receives the print data and prints the print data on a print medium.

With the aspect of the present invention, the size of the original can be determined by way of image processing to obtain the precise judgement result, according to which the suitable print medium can be selected as the medium to be printed. This is advantageous to the elimination of the cost of the original size detector, and can also determine the size of the original, select the suitable print medium tray, and provide the more human-oriented service.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

Figure 1:
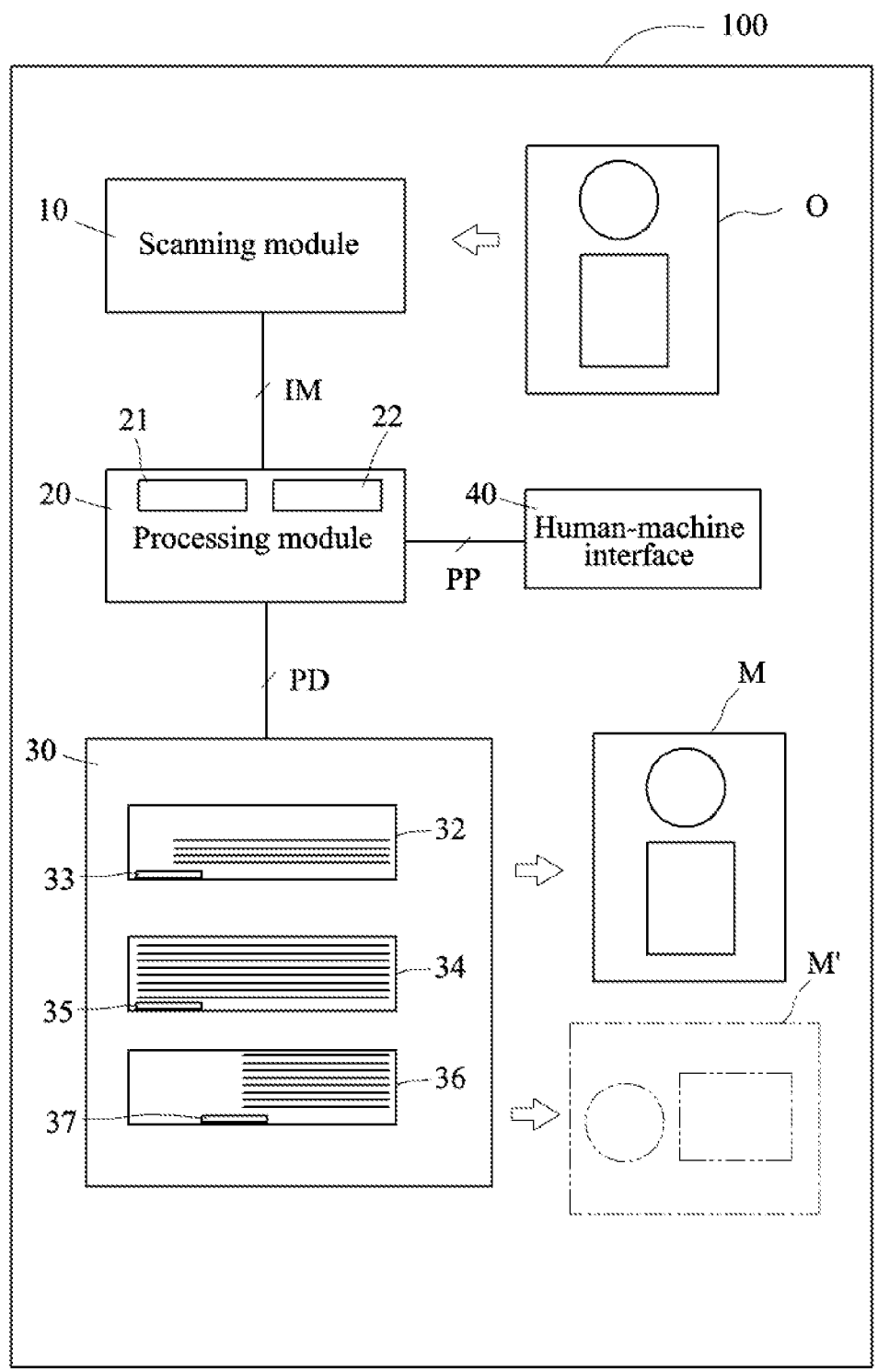
FIG. 1 is a block diagram showing a smart copy apparatus according to a preferred embodiment of the present invention.

FIG. 1 is a block diagram showing a smart copy apparatus 100 according to a preferred embodiment of the present invention. Referring to FIG. 1, the smart copy apparatus 100 of this embodiment comprises a scanning module 10, a processing module 20 and a printing module 30, which may also be referred to as a scanner, a processor and a printer, respectively.

The scanning module 10 scans an original O to obtain fragment scan images IM (i.e., scan-line images). The scan operation can be performed as long as a relative movement between the scanning module 10 and the original O is present. Thus, the scan operation may be a flatbed scan operation or a sheet-fed scan operation. In the flatbed scan operation, the original O is placed on a scan platen, and the scanning module 10 moves back and forth to acquire an image of the original O. In the sheet-fed scan operation, the scanning module 10 is kept stationary, while the original O is transported past the scanning module 10 by a transporting mechanism, so that the scanning module 10 acquires the image of the original O.

The processing module 20 electrically connected to the scanning module 10 receives the fragment scan images IM, determines a size (e.g., A4 size) of the original O according to the fragment scan images IM to obtain a scan-size parameter (e.g., a parameter corresponding to the A4 size), and generates print data PD according to the fragment scan images IM, the scan-size parameter and a print parameter. The print parameter may be stored in a database of the smart copy apparatus in advance, and may also be set by a user through a human-machine interface 40 of the smart copy apparatus 100. The human-machine interface 40 comprises, for example but without limitation to, a touch screen, a keyboard, a button, a touch panel or the like.

The printing module 30 receives the print data PD, and prints the print data PD on a print medium M. The printing module 30 may be a thermal induction printing module, an ink-jet printing module, a laser printing module or the like.

In one example, the processing module 20 can determine a boundary of the original according to all of the fragment scan images IM to determine the size of the original O. In order to facilitate the boundary determination, a background pattern different from the original can be utilized to serve as a background of the original. Alternatively, the boundary can be determined using a typical background pattern (e.g., a fully white or fully black background) in conjunction with a sensing property of a sensor of the scanning module.

Figure 2:
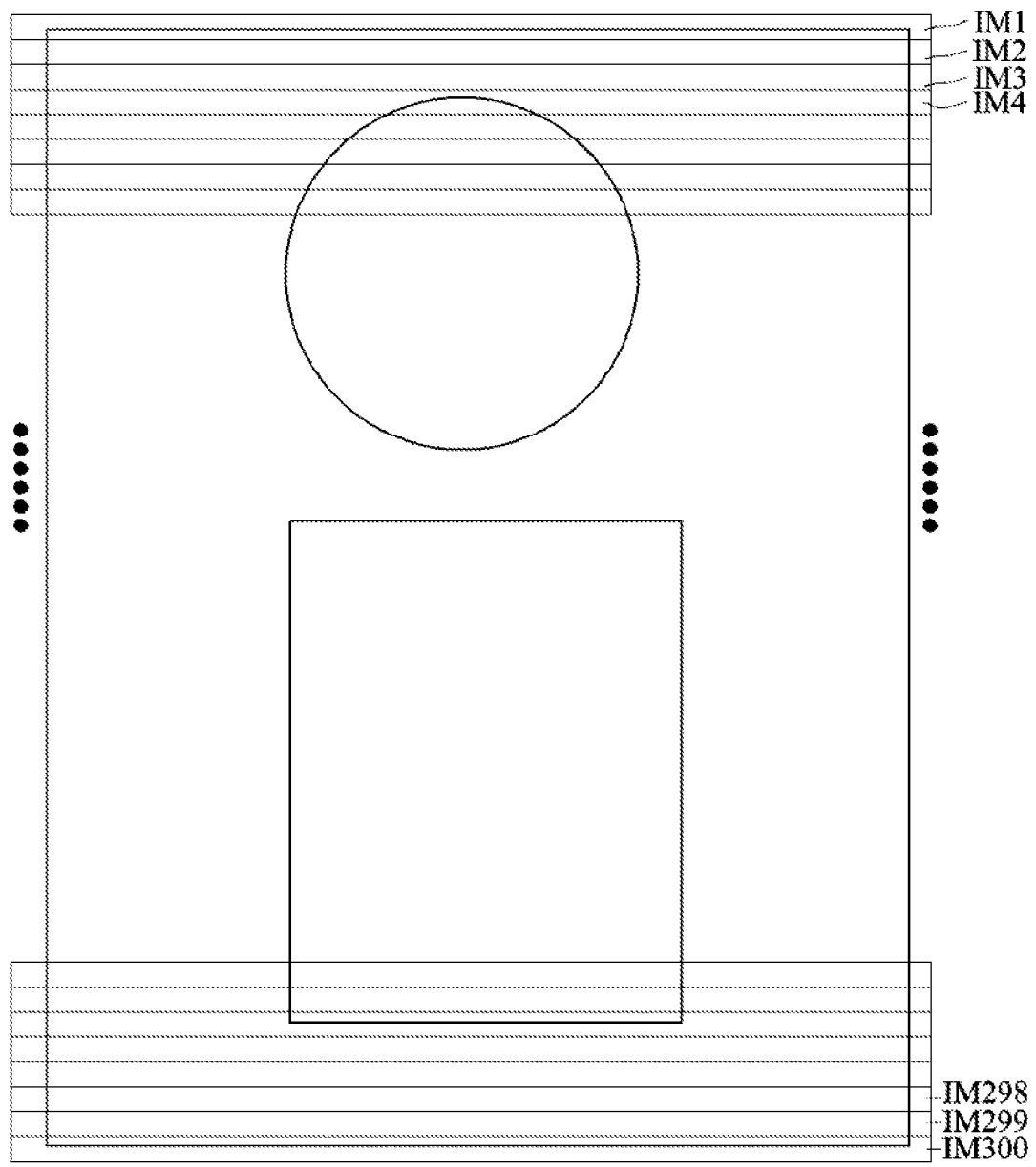
FIG. 2 is a schematic view showing a fragment scan image.

FIG. 2 is a schematic view showing the fragment scan images IM. Referring to FIG. 2, the fragment scan images IM comprises fragment scan images IM1 to IM300 aligned with each other and connected with each other in a side-by-side manner to form the image of the original. It is worth noting that the number of the fragment scan images is proposed for the illustrative purpose only, and does not intend to restrict the invention.

In another example, the processing module 20 determines the size of the original O according to the former M fragment scan images IM and the later N fragment scan images IM of the fragment scan images IM, where M and N are positive integers greater than 1, and a sum of M and N is smaller than the total number of the fragment scan images IM. That is, the other middle fragment scan images IM are not adopted by the processing module 20 to determine the size of the original O. For example, the size of the original O is determined according to the former fragment scan images IM1 to IM3 and the later fragment scan images IM298 and IM300. In still another example, the processing module 20 determines the width of the original according to the fragment scan images IM1 to IM3, and then eliminates left and right side data (e.g. 30 left-side pixels and 40 right-side pixels) of the subsequent fragment scan images IM4 to IM300 according to the width. Thus, the data quantity is decreased, and the real-time processing effect is achieved.

Figure 3:
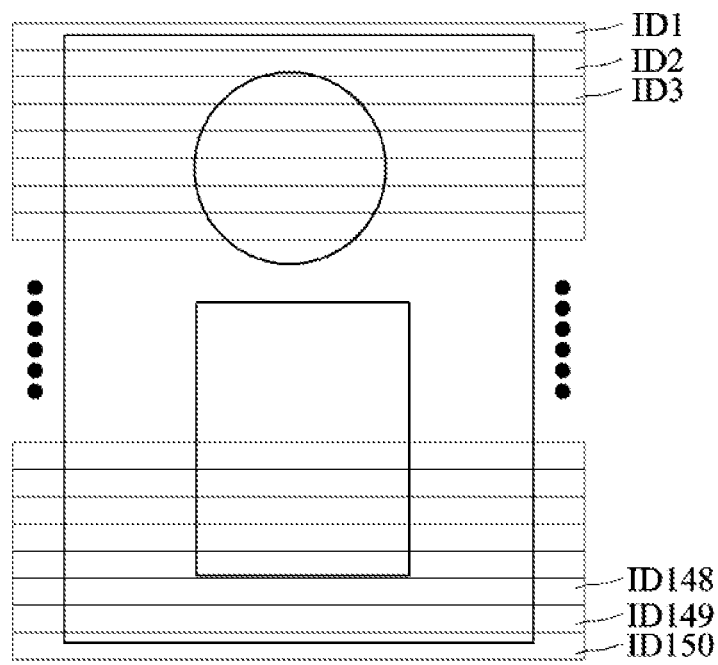
FIG. 3 is a schematic view showing a size-determining section image.

FIG. 3 is a schematic view showing a size-determining section image. Referring to FIGS. 3 and 2, the processing module 20 filters the fragment scan images IM by way of resolution-reduction to obtain size-determining section images ID, and determines the size of the original O according to the size-determining section images ID. For example, 300 fragment scan images IM1 to IM300 of FIG. 2 are filtered by reducing the resolution to 50% to obtain 150 size-determining section images ID1 to ID150 of FIG. 3. It is worth noting that the longitudinal resolution and the transversal resolution may also be reduced to 50% to decrease the data quantity. In another embodiment, the transversal resolution of the size-determining section image gets lower as the position of the size-determining section image gets closer to the middle of the size-determining section image, and the transversal resolution of the size-determining section image gets higher as the position of the size-determining section image gets closer to each of two sides of the size-determining section image. This means that one or each of the size-determining section images has different resolutions. This is advantageous to the precise determination of the left boundary and the right boundary of the original while maintaining the low data quantity.

In one example, the processing module 20 has a first storage region 21 and a second storage region 22. Using a simple filter (not shown), the first storage region 21 directly stores the size-determining section images ID1 to ID150, and the second storage region 22 directly stores the fragment scan images IM1 to IM300. The processing module 20 can process the data of the first storage region 21 to determine the size of the original. After the size of the original is determined, the data of the first storage region 21 is cleared, and the first storage region 21 serves as a buffer, in which the processing module 20 processes the fragment scan images IM1 to IM300 of the second storage region 22.

In addition, as shown in FIG. 1, the processing module 20 may also determine a ratio, by which a resolution is divided, according to a precision parameter PP set by a user. For example, the user can set the precision parameter PP to be the lowest level through the human-machine interface 40, and the ratio, by which a resolution is divided, is 10 (600 DPI is reduced to 60 DPI); the user can set the precision parameter PP to be the moderate level through the human-machine interface 40, and the ratio, by which a resolution is divided, is 3; or the user can set the precision parameter PP to be the highest level through the human-machine interface 40, and the ratio, by which a resolution is divided, is 2. The numbers in the examples do not intend to restrict the present invention, and those skilled in the art may also adjust the numbers according to the design requirements.

Similarly, the processing module 20 determines the size of the original O according to the former m size-determining section images ID and the later n size-determining section images ID of the size-determining section images ID, wherein m and n are positive integers greater than 1, and a sum of m and n is smaller than a total number of the size-determining section images ID. That is, the other middle size-determining section images ID are not adopted by the processing module 20 to determine the size of the original O. For example, the processing module 20 determines the size of the original O according to the size-determining section images ID1 to ID3 and the size-determining section images ID148 to ID150.

In this embodiment, the smart copy apparatus 100 does not comprise an original size detector for detecting the size of the original O.

Referring again to FIG. 1, the printing module 30 comprises print medium trays 32, 34 and 36 for storing different sizes of print media M, wherein the print medium trays 32, 34 and 36 have print medium detectors 33, 35 and 37, respectively. Each of the print medium detectors 33, 35 and 37 is electrically connected to the processing module 20 and generates a print parameter signal. The processing module 20 generates the print parameter according to the print parameter signals. The print parameter signal may be the size and/or number of the print media. The number is not restricted to the result of true (>0) or false (=0), and may comprise the precise number or roughly estimated number of the print media. For example, the print medium trays 32, 34 and 36 store longitudinal A4, longitudinal A3 and transversal A4 sheets, respectively. The print medium detectors 33, 35 and 37 also successfully detect the information as the print parameter signal. When no sheet is present in the print medium trays 34 and 36, the processing module 20 only can generate the print data according to the print parameter of the print medium tray 32 in conjunction with the fragment scan images IM and the scan-size parameter. It is worth noting that in another example, the print medium detectors 33, 35 and 37 may also be omitted, and the user is requested to place the sheets with the specified sizes in the print medium trays 32, 34 and 36. In still another example, the print medium detectors 33, 35 and 37 are only utilized to detect the numbers of the media stored in the print medium trays 32, 34 and 36, respectively.

In another example, when all the print medium trays 32, 34 and 36 contain the sheets, the processing module 20 generates the print data according to the print parameters of the print medium trays 32, 34 and 36 in conjunction with the fragment scan images IM, the scan-size parameter and the print medium tray selected by the user, or the processing module 20 generates the print data according to the experience or the print parameter of the print medium tray selected after calculation. For example, the processing module 20 rotates an original image composed of the fragment scan images IM by 0 and 90 degrees to match with the print sizes corresponding to the print parameter signals to generate the print parameter. For example, when the print medium tray 32 is much more matched, the processing module 20 only can generate the print data according to the print parameter of the print medium tray 32 in conjunction with the fragment scan images IM and the scan-size parameter.

In still another example, the processing module 20 rotates the original image composed of the fragment scan images IM by 0 and 90 degrees to match with the print sizes corresponding to the print parameter signals. When matched two of the print medium trays 32, 34 and 36 are obtained, the processing module 20 further generates the print parameter according to the number of media of the print parameter signals to select one of the print medium trays 32, 34 and 36 from two of the print medium trays 32, 34 and 36 containing more print medium M as a supply tray for printing. For example, when the matched trays are the longitudinal A4 and transversal A4 print medium trays 32 and 36, the processing module 20 judges that the number of sheets in the print medium tray 36 is greater than that in the print medium tray 32, and thus selects the print medium tray 36 as the supply tray for printing. So, the processing module 20 generates the print data according to the print parameter of the print medium tray 36 in conjunction with the fragment scan images IM and the scan-size parameter, and the transversal A4 print medium or media M' are finally outputted. Consequently, the user needs not to place the new print media into the print medium tray 32.

In still another example, the processing module 20 judges whether the same print medium tray is lack of media according to the number of copies set by the user. In order to prevent the user from placing new print media into the tray, the processing module 20 can select the print medium tray with the sufficient media as the supply tray for printing.

Figure 4:
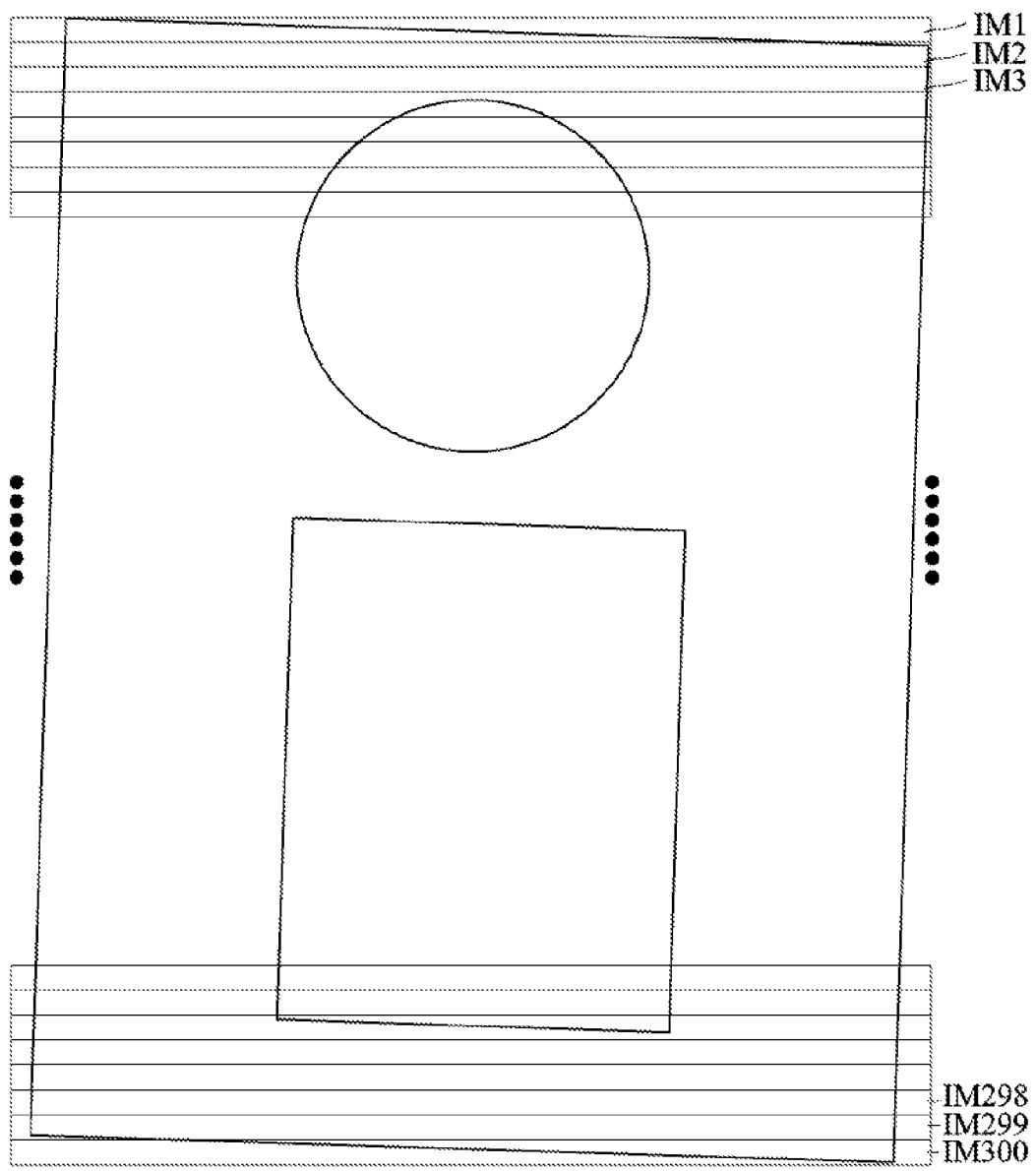
FIG. 4 is a schematic view showing the skew calibration of the fragment scan image.

FIG. 4 is a schematic view showing the skew calibration of the fragment scan image. As shown in FIG. 4, before the size of the original O is determined, the processing module 20 firstly determines a skew of the original O according to the fragment scan images IM. The image de-skew and size judgement can be performed according to the skew. In general, the skew can be determined according to the several former fragment scan images IM. After the skew is determined, each of the subsequent fragment scan images can be directly calibrated and then stored to the processing module 20 for the purpose of the subsequent size judgement and print data generation. So, the processing module needs not to process the whole skew image.

With the embodiment of the present invention, the size of the original can be determined by way of image processing to obtain the precise judgement result, according to which the suitable print medium can be selected as the medium to be printed. This is advantageous to the elimination of the cost of the original size detector, and can also determine the size of the original, select the suitable print medium tray, and provide the more human-oriented service.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A smart copy apparatus, comprising:
    a scanner scanning an original to obtain fragment scan images;
    a processor, which is electrically connected to the scanner, receives the fragment scan images, determines a size of the original according to the fragment scan images to obtain a scan-size parameter, and generates print data according to the fragment scan images, the scan-size parameter and a print parameter; and
    a printer receiving the print data and printing the print data on a print medium, wherein the processor filters the fragment scan images by way of resolution-reduction to obtain size-determining section images, and determines the size of the original according to the size-determining section images, wherein one of the size-determining section images has different resolutions.

2. The smart copy apparatus according to claim 1, wherein the smart copy apparatus has no detector for detecting the size of the original.

3. The smart copy apparatus according to claim 1, wherein the printer comprises:
    print medium trays storing different sizes of print media, wherein each of the print medium trays has a print medium detector, which is electrically connected to the processor and generates a print parameter signal, wherein the processor generates the print parameter according to the print parameter signals.

4. The smart copy apparatus according to claim 3, wherein the processor rotates an original image composed of the fragment scan images by 0 and 90 degrees to match with print sizes corresponding to the print parameter signals to generate the print parameter.

5. The smart copy apparatus according to claim 3, wherein the processor rotates an original image composed of the fragment scan images by 0 and 90 degrees to match with print sizes corresponding to the print parameter signals, wherein when matched two of the print medium trays are obtained, the processor further generates the print parameter according to a number of media of the print parameter signals to select one of the print medium trays containing more print media than the other of the print medium trays as a supply tray for printing.

6. The smart copy apparatus according to claim 1, wherein before the size of the original is determined, the processor determines a skew of the original according to the fragment scan images.

7. The smart copy apparatus according to claim 1, wherein each of the size-determining section images has different resolutions.

8. The smart copy apparatus according to claim 1, wherein a resolution of each of the size-determining section images gets lower as a position of the size-determining section image gets closer to a middle of the size-determining section image, and the resolution of each of the size-determining section images gets higher as the position of the size-determining section image gets closer to each of two sides of the size-determining section image.

9. A smart copy apparatus, comprising:
    a scanner scanning an original to obtain fragment scan images;
    a processor, which is electrically connected to the scanner, receives the fragment scan images, determines a size of the original according to the fragment scan images to obtain a scan-size parameter, and generates print data according to the fragment scan images, the scan-size parameter and a print parameter; and
    a printer receiving the print data and printing the print data on a print medium, wherein the processor filters the fragment scan images by way of resolution-reduction to obtain size-determining section images, and determines the size of the original according to the size-determining section images, wherein the processor determines the size of the original according to the former m size-determining section images and the later n size-determining section images of the size-determining section images, where m and n are positive integers greater than 1, and a sum of m and n is smaller than a total number of the size-determining section images.

10. The smart copy apparatus according to claim 9, wherein the processor determines a ratio, by which a resolution is divided, according to a precision parameter set by a user.

11. A smart copy apparatus, comprising:
   a scanner scanning an original to obtain fragment scan images;
   a processor, which is electrically connected to the scanner, receives the fragment scan images, determines a size of the original according to the fragment scan images to obtain a scan-size parameter, and generates print data according to the fragment scan images, the scan-size parameter and a print parameter; and
   a printer receiving the print data and printing the print data on a print medium, wherein the processor determines the size of the original according to the former M fragment scan images and the later N fragment scan images of the fragment scan images, where M and N are positive integers greater than 1, and a sum of M and N is smaller than a total number of the fragment scan images.

* * * * *